(12) United States Patent
Zolfaghari (10) Patent No.: US 7,577,359 B2
(45) Date of Patent: Aug. 18, 2009

(54) SYSTEM AND METHOD FOR SONET TRANSPORT OPTIMIZATION (S-TOP)

(75) Inventor: Ali Zolfaghari, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 911 days.

(21) Appl. No.: 10/838,179

(22) Filed: May 3, 2004

(65) Prior Publication Data

US 2005/0243738 A1 Nov. 3, 2005

(51) Int. Cl.
*H04B 10/00* (2006.01)

(52) U.S. Cl. .............................. 398/59; 398/58; 398/70

(58) Field of Classification Search .................. 398/25, 398/58, 59, 70
See application file for complete search history.

(56) References Cited

U.S. PATENT DOCUMENTS

| | | | | |
|---|---|---|---|---|
| 5,590,395 A * | 12/1996 | Diekelman | ................ | 455/13.1 |
| 5,680,325 A * | 10/1997 | Rohner | ........................ | 709/220 |
| 5,940,373 A * | 8/1999 | Chiu et al. | ................... | 370/238 |
| 6,266,322 B1 * | 7/2001 | Berger et al. | ................. | 370/229 |
| 6,668,056 B2 * | 12/2003 | Rupe et al. | ............. | 379/266.03 |
| 6,728,460 B2 * | 4/2004 | Glynn et al. | ................. | 385/135 |
| 6,771,905 B1 | 8/2004 | Bortz | | |
| 6,775,479 B2 | 8/2004 | Milton et al. | | |
| 6,798,752 B1 * | 9/2004 | Pope | ........................... | 370/254 |
| 7,082,102 B1 * | 7/2006 | Wright | ........................ | 370/229 |
| 7,123,588 B2 * | 10/2006 | Mitra et al. | ................... | 370/238 |
| 2002/0141351 A1 * | 10/2002 | Maltz et al. | ................... | 370/254 |
| 2005/0195749 A1 * | 9/2005 | Elmasry et al. | ............. | 370/252 |
| 2005/0195815 A1 * | 9/2005 | Chaudhuri | .................. | 370/389 |
| 2005/0204033 A1 * | 9/2005 | Venugopal et al. | .......... | 709/224 |

\* cited by examiner

*Primary Examiner*—Agustin Bello
(74) *Attorney, Agent, or Firm*—Toler Law Group (57) ABSTRACT

A method for designing a communication network is provided. First, network demand data is gathered. Network architecture data is also gathered. Based in part on the network demand data and the network architecture data, a network plan is automatically generated.

34 Claims, 9 Drawing Sheets

Point-to-Multipoint Configuration

Figure 3
Hub Configuration

Figure 4
Ring Configuration

Figure 5

General Functional Logic

Figure 6

General Implementation Logic

Figure 7
Detailed Operating Logic

Figure 8

Grooming Tool Logic

Figure 9

Network Planning Tool Logic

Figure 10
Exemplary Multi-Period Network Planning Logic

SYSTEM AND METHOD FOR SONET TRANSPORT OPTIMIZATION (S-TOP)

FIELD OF THE DISCLOSURE

The present disclosure relates to the design of SONET transport networks.

BACKGROUND

Synchronous Optical Network (SONET) is a standard for optical transport that has been formulated by the Exchange Carriers Standards Association (ECSA) for the American National Standards Institute (ANSI). ANSI sets industry standards in the United States for telecommunications and other industries. The International Telecommunications Union (ITU) has incorporated SONET into their Synchronous Digital Hierarchy recommendations.

The introduction of SONET has resulted in numerous benefits for network providers. First, data transmission rates up to 10 Gigabits per second (Gbit/s) are standardized in SONET systems. This makes SONET a suitable technology for network backbones, i.e., the "superhighways" of modern telecommunications networks. SONET also provides more efficient add/drop multiplexing (ADM) than pre-SONET systems. Additionally, with SONET, network providers can react quickly and easily to the requirements of their customers, e.g., leased lines can be switched in a matter of minutes. And, a network provider can use standardized network elements that can be controlled from a central location by means of a telecommunications management network.

Modern SONET systems include various automatic back-up and repair mechanisms to cope with system faults. Failure of a link or network element does not lead to the failure of the entire network. These back-up connections can also be monitored by a management system. Moreover, SONET is able to handle new, upcoming services such as video on demand and digital video broadcasting via asynchronous transfer mode (ATM). Finally, SONET supports gateways between different network providers and synchronous digital hierarchy (SDH). SONET interfaces are standardized. Thus, it is possible to combine network elements from different manufacturers into a network.

SONET defines optical carrier (OC) levels and the electrically equivalent synchronous transport signals (STS) for the fiber-optic based transmission hierarchy. For example, an OC-1 is equivalent to an STS-1 and provides a data transmission rate of 51.84 Mega bits per second (Mbps). Higher line rates are integer multiples of the base rate of 51.84 Mbps. In other words, an OC-3, and the corresponding STS-3, has a data transmission rate equal to 3 times 51.84 Mbps or 155.52 Mbps. Under the SONET standard, OC-3, OC-12, OC-48, and OC-192 are the most widely supported fiber-optic rates.

Existing SONET transport network analysis, i.e., design and planning methods and procedures (M & P), relies heavily on manual ad hoc approaches that are not adequate for complex metro networks and current evolving new technologies and market dynamics. Due to the recent increase in fiber connectivity in transport networks, the task of manual design of optimal SONET based ring networks is becoming complex and impractical.

Accordingly, there is a need for an improved system and method for analyzing and designing SONET transport networks.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

A method for designing a communication transport network is provided. First, existing network and demand data can be gathered. Network architecture data can also be gathered. Based in part on the network demand data and the network architecture data, a network plan can be generated. In a particular embodiment, depending on data type, demand files can be processed with a grooming tool to yield interim demand files. The interim demand files can be input to a network planning tool. The network planning tool can generate a network plan based in part on the interim demand files.

Also, in this particular embodiment, the network plan can be validated. Moreover, a preferred routing plan report can be generated for the valid network plan. A ring profile report can also be generated for the valid network plan.

In another aspect of an illustrative embodiment of the present disclosure, a computer program for designing a communication network is provided. The computer program includes logic for performing several steps. For example, network demand data can be received. Network architecture data can also be received. Thereafter, a network plan can be generated based in part on the network demand data and the network architecture data.

In still another aspect of an illustrative embodiment of the present disclosure, a computer system for designing a communications network is provided. The computer system includes a grooming tool and a network planning tool that can be used to automatically generate a network plan.

Figure 1:
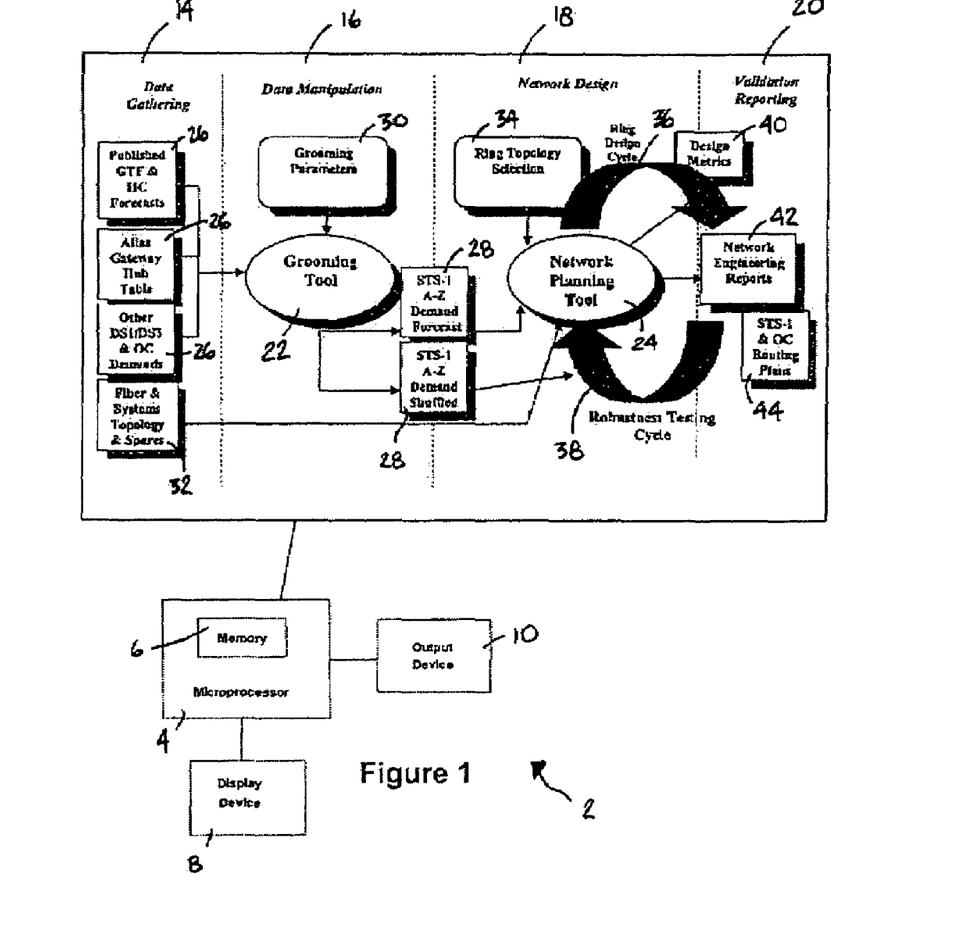
FIG. 1 shows the main building blocks of the SONET transport network optimization process (S-TOP) including computer systems that pre-process network data and perform network analysis and planning.

Referring now to FIG. 1, a computer system for executing network planning software is shown and is generally designated 2. As shown, the computer system 2 includes a microprocessor 4 that has a memory 6, e.g., a hard disk drive. FIG. 1 shows that the computer system 2 further includes a display device 8, e.g., a monitor, upon which a user can view network plans developed using the network planning software described in detail below. Additionally, the computer system 2 can include an output device 10, e.g., a printer.

FIG. 1 further shows a non-limiting, exemplary embodiment of network planning software (S-TOP), designated 12, that can reside within the microprocessor 4, e.g., within the memory 6 thereof. In general, the network planning software 12 includes a data gathering module 14, a data manipulation module 16, a network design module 18, and a validation and reporting module 20. As shown, the network planning software 12 can include a grooming tool 22, e.g., within the data manipulation module 16, and a network planning tool 24, e.g., within the network design module 18. As described in detail below, the grooming tool 22 can be used to groom, or otherwise transform, network demand data 26 that is input to the grooming tool 22, e.g., via the data gathering module 14, in order to yield plural interim demand files 28. The interim demand files 28, in turn, can be input to the network planning tool 24 where they are used as described below during the design of a network plan. As further shown in FIG. 1, one or more grooming parameters 30 can be input to the grooming tool 22 and can be used to determine how the demand data 26 is groomed by the grooming tool 22. It is to be understood that a detailed description of the grooming tool logic is provided below. That detailed description includes exemplary network demand data 26 and exemplary grooming parameters 30.

Referring still to FIG. 1, network architecture data 32, such as fiber and system topology data, can be input to the network planning tool 24 in addition to the interim demand files 28. Also, as the network planning tool 24 is used, to design a network plan, a user can make a ring topology selection 34 based on the design choices presented by the network planning tool 24. As further shown in FIG. 1, during the design of a network plan by the network planning tool 24, a ring design cycle 36 and a robustness testing cycle 38 can be performed. FIG. 1 also shows that the network planning software 12 can include plural design metrics 40 that can be used by the network planning tool 24 during the ring design cycle 38. Once the network planning tool 24 has satisfactorily completed the ring design cycle 36 and the robustness testing cycle 38, network engineering reports 42 can be created by the validation and reporting module 20 and further, can be output by the network planning tool 24, e.g., via the output device 18. The network engineering reports 42 can include STS-1 & OC routing plans.

Figure 2:
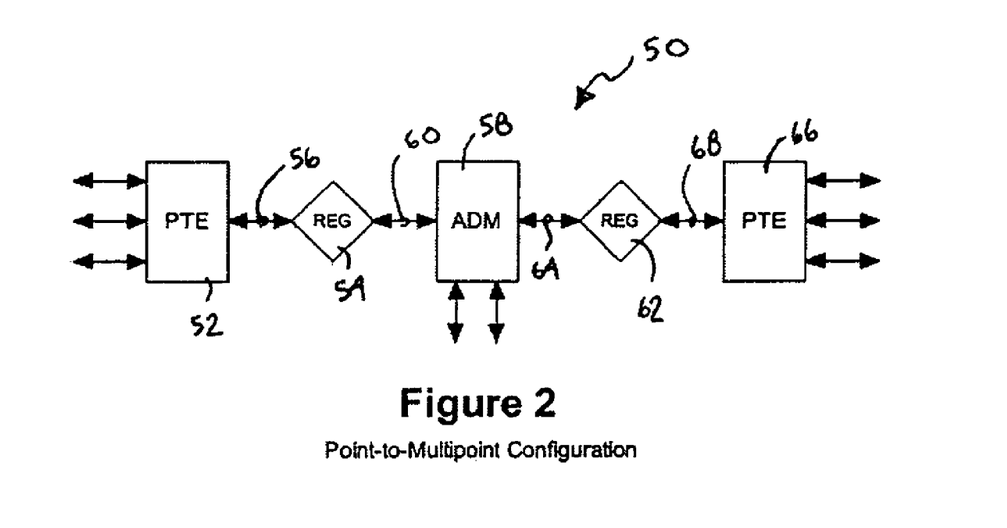
FIG. 2 is a block diagram of a representative SONET point-to-multipoint configuration that can be modeled by the network planning tool.

FIG. 2 shows a representative SONET point-to-multipoint network system, generally designated 50. Such a system may correspond to an output of the ring design cycle including network planning tool 24 (FIG. 1). As shown in FIG. 2, the point-to-multipoint network system 50 includes a first set of path terminating equipment (PTE) 52 connected to a first regenerator 54 via a first fiber optic cable 56. The regenerator 54, in turn, can be connected to an add/drop multiplexer (ADM) 58 via a second fiber optic cable 60. The regenerator 54 can be used to regenerate the clock and amplitude relationships of the incoming data signals that have been attenuated and distorted by dispersion. Thus, the regenerator 54 can restore a degraded digital signal for continued transmission. The regenerator 54 derives its clock signals from the incoming data stream. Messages can be received by the regenerator by dropping various 64 kilobit per second (kbit/s) channels, e.g., service channels E1 and F1, from the section overhead (SOH) of the synchronous transport signal (STS). Messages can also be output by the regenerator 54 using these channels. It is to be understood that the regenerator 54 is not required, but is useful as the distance between the first set of PTE 52 and the second set of PTE 66 increases. FIG. 2 shows that the ADM 58 can then be connected to a second regenerator 62 via a third fiber optic cable 64. Finally, the second regenerator 62 can be connected to a second set of PTE 66 via a fourth fiber optic cable 68. Further, it is to be understood that each set of PTE includes a path terminating terminal multiplexer that acts as a concentrator of digital signals (DS), e.g., DS-1s as well as other tributaries.

It is to be understood that with the point-to-multipoint network system 50 shown in FIG. 2 it can be necessary to add and drop channels during signal transmission. The ADM 58 is a unique network element specifically designed to add and drop channels as required during signal transmission. Moreover, the ADM 58 eliminates the need for the relatively cumbersome network architecture required for de-multiplexing, cross-connecting, adding and dropping channels, and then, re-multiplexing. The ADM 58 is typically placed along a SONET link to facilitate adding and dropping tributary channels at intermediate points in the SONET network.

Figure 3:
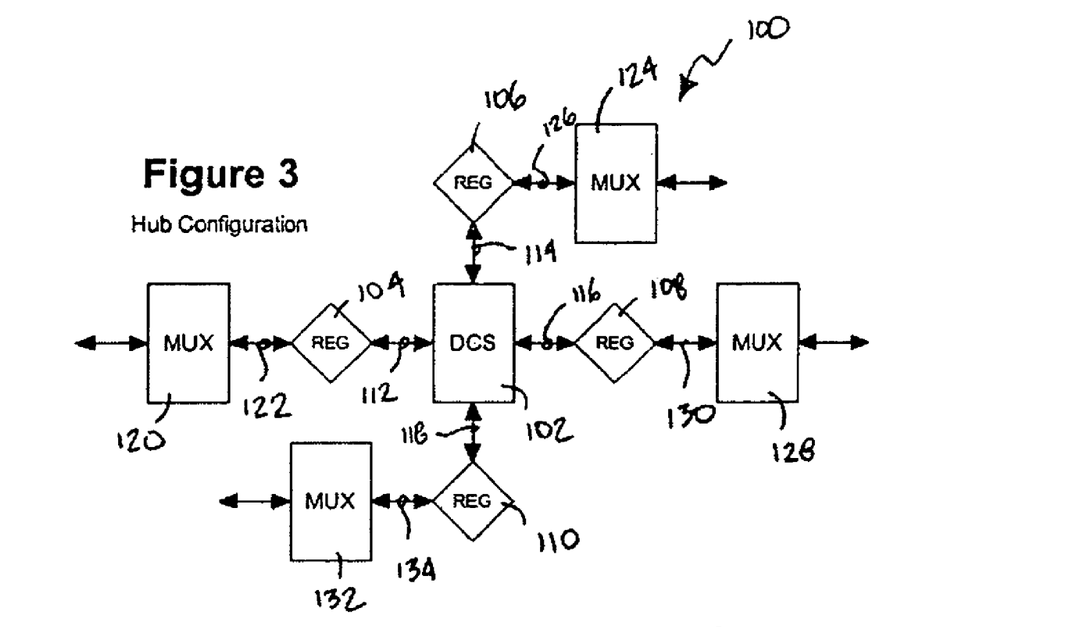
FIG. 3 is a block diagram of a representative SONET hub configuration that can be modeled by the network planning tool.

Referring now to FIG. 3, a non-limiting, exemplary embodiment of a SONET hub network system is shown and is generally designated 100. As shown in FIG. 3, the SONET hub network system 100 utilizes a digital cross-connect system (DCS) 102 as a hub. A first regenerator 104, a second regenerator 106, a third regenerator 108, and a fourth regenerator 110 are each connected to the DCS 102 via respective fiber optic cables 112, 114, 116, 118. Also, as shown in FIG. 3, a first multiplexer 120 is connected to the first regenerator 104 via a fiber optic cable 122. A second multiplexer 124 is connected to the second regenerator 106 via a fiber optic cable 126. Moreover, a third multiplexer 128 is connected to the third regenerator 108 via a fiber optic cable 130. Finally, a fourth multiplexer 132 can be connected to the fourth regenerator 110 via a fiber optic cable 132.

It can be appreciated that a hub network, e.g., the SONET hub network system 100 shown in FIG. 3, can accommodate unexpected growth and change more easily than a simple point-to-point network system. A hub network concentrates traffic at a central site and allows easy reprovisioning of the circuits extending from the central site. It is to be understood that the DCS 102 can be a wideband digital cross-connect system (WDCS), which can allow cross-connecting the tributary services at the tributary level and perform traffic grooming. Or, the DCS 102 can be a broadband digital cross-connect system (BDCS), which allows cross-connecting at the SONET level.

Figure 4:
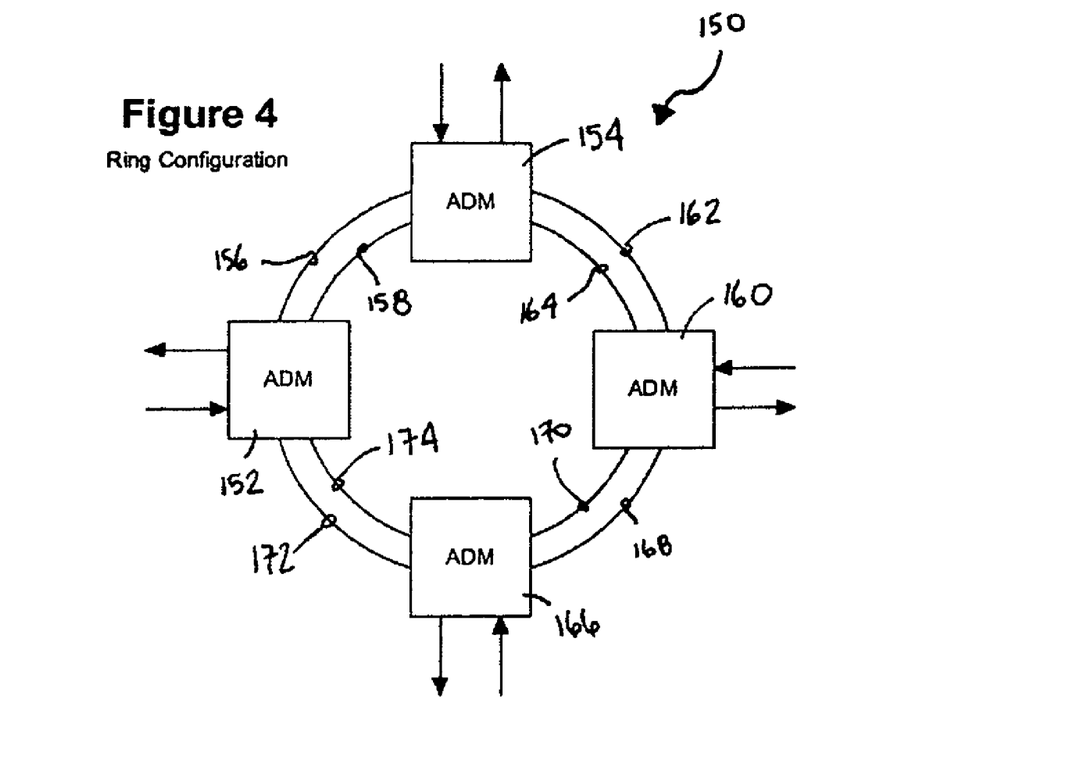
FIG. 4 is a block diagram of a representative of both uni-directional path-switched ring (UPSR) and bidirectional line-switched rings (BLSR) SONET ring configurations that can be modeled by the network planning tool.

FIG. 4 shows a non-limiting, exemplary embodiment of a SONET ring network system, generally designated 150. As shown, the SONET ring network system 150 includes a first ADM 152 connected to a second ADM 154 via a first fiber optic cable 156 and a second fiber optic cable 158. A third ADM 160 can be connected to the second ADM 154 via a third fiber optic cable 162 and a fourth fiber optic cable 164. Moreover, a fourth ADM 166 can, in turn, be connected to the third ADM 160 via a fifth fiber optic cable 168 and a sixth fiber optic cable 170. Finally, a seventh fiber optic cable 172 and an eighth fiber optic cable 174 can connect the fourth ADM 166 to the first ADM 152 to establish a generally ring-shaped configuration.

It is to be understood that the SONET ring network provides two separate redundant physical paths between a pair of terminals. These redundant paths combining with protection switch mechanisms maintain the data connection when a cable is cut or equipment failures occur.

A SONET ring network can be configured as a path-switch ring or line-switched ring. A path-switched ring has a separate protection switch mechanism for each path. A line-switched ring has a separate protection switch mechanism for each line. There are two kinds of standard SONET rings, one is a two-fiber unidirectional path-switched ring (UPSR), another is a two-fiber or four-fiber bidirectional line-switched rings (BLSR). All of these rings comprise a sequence of SONET ADMs arranged in a closed loop. When a facility failure occurs, such an outside plant fiber being cut by construction equipment, the SONET ADMs react to the failure and reroute all of the traffic typically within 60-100 msec. This is done by the ADM whose one of two ports cannot handle traffic because of a failure condition in the link connected to that port applying that traffic to a spare fiber or to the fiber that carries traffic in the reverse direction in the ring.

In the case of UPSR, robust ring operation is achieved by sending data in both directions around the ring for all inter-node traffic on the ring. This is shown in FIG. 1. This figure shows four nodes (152, 156, 160 and 166) equipped with ADMs and interconnected by fiber spans.

In the case of two-fiber BLSR, data from any given node to another node typically travels in one direction around the ring. Half the capacity of each ring is reserved to protect against span failures on the other ring.

Both UPSR and BLSR protections require 100% extra capacity over that which would be required for an unprotected ring, since the equivalent of the bandwidth of one full ring is not used except in the event of a span failure. In addition BLSR requires ring-level signaling between nodes to communicate information on span cuts and proper coordination of nodes to initiate ring protection.

Figure 5:
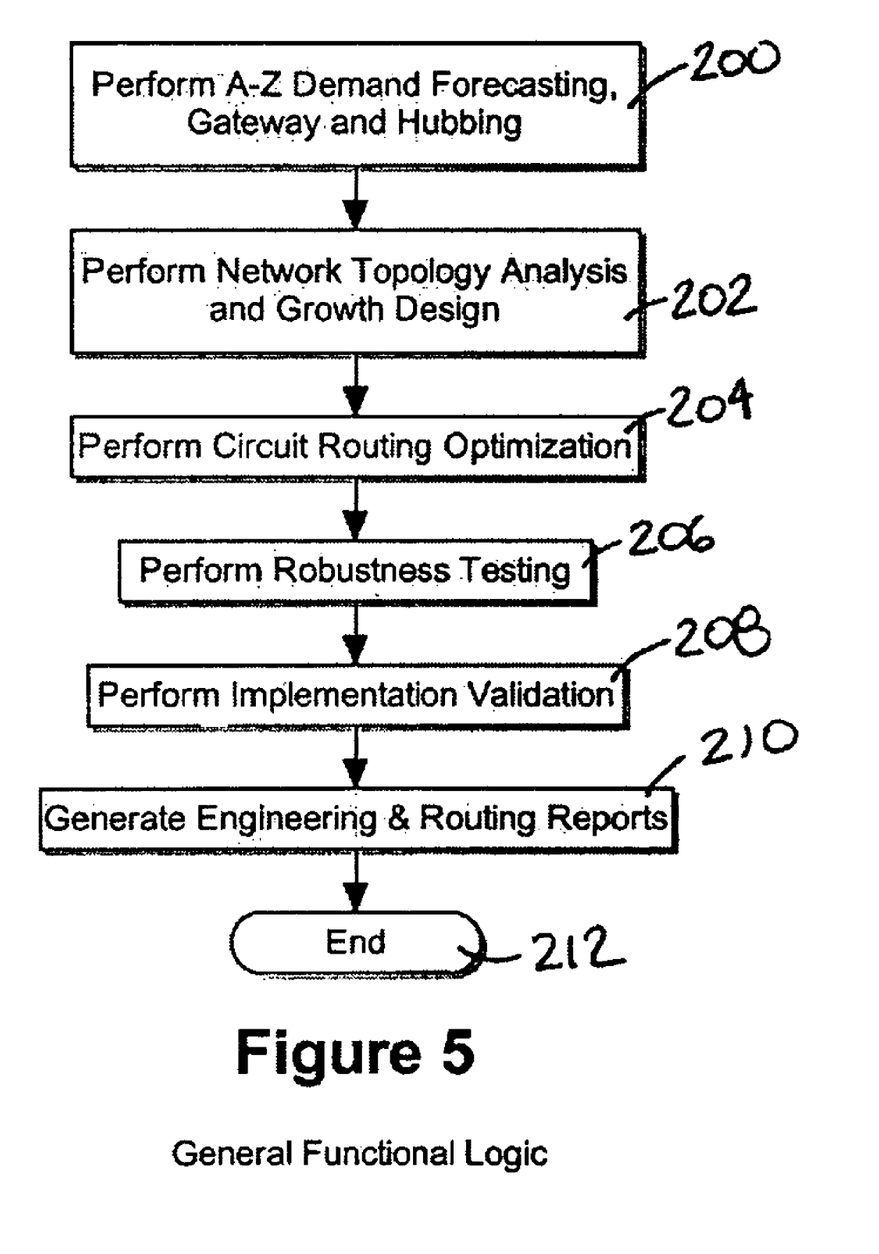
FIG. 5 is a flow chart to illustrate general functional logic of an embodiment of network planning and optimization process (S-TOP)

In a four-fiber BLSR, two lines connect neighboring nodes, a working line and a protection line. The working line provides the working bandwidth and the protection line provides the protection bandwidth. Each line is formed of two fibers, one for each direction of traffic flow. Thus, the working line includes a send working fiber and a receive working fiber, while the protection line includes a send protection fiber and a receive protection fiber. The term "bi-directional" of BLSR refers to the fact that if one fiber of the working line fails, or if a piece of equipment to which one fiber of the working line is connected fails, traffic for both directions is re-routed. Specifically, if a working line suffers a data transmission impairment, either a fiber failure or an equipment failure, a span switch allows the protection line to be used as an alternate route Referring to FIG. 5, the general functional logic for SONET transport network optimization (S-TOP) according to a particular embodiment is shown and commences at block 200 where A-Z demand forecasting is performed. It is to be understood that this includes gateway information and hubbing information. Moving to block 202, a network topology analysis and growth design is performed. Thereafter, at block 204, a circuit routing optimization is performed. Proceeding to block 206, robustness testing of the design resulting from step 202, above, is performed. Next, the logic moves to step 208 where an implementation validation of that same design is performed. At block 210, engineering and routing reports are generated. The logic then ends at state 212.

Figure 6:
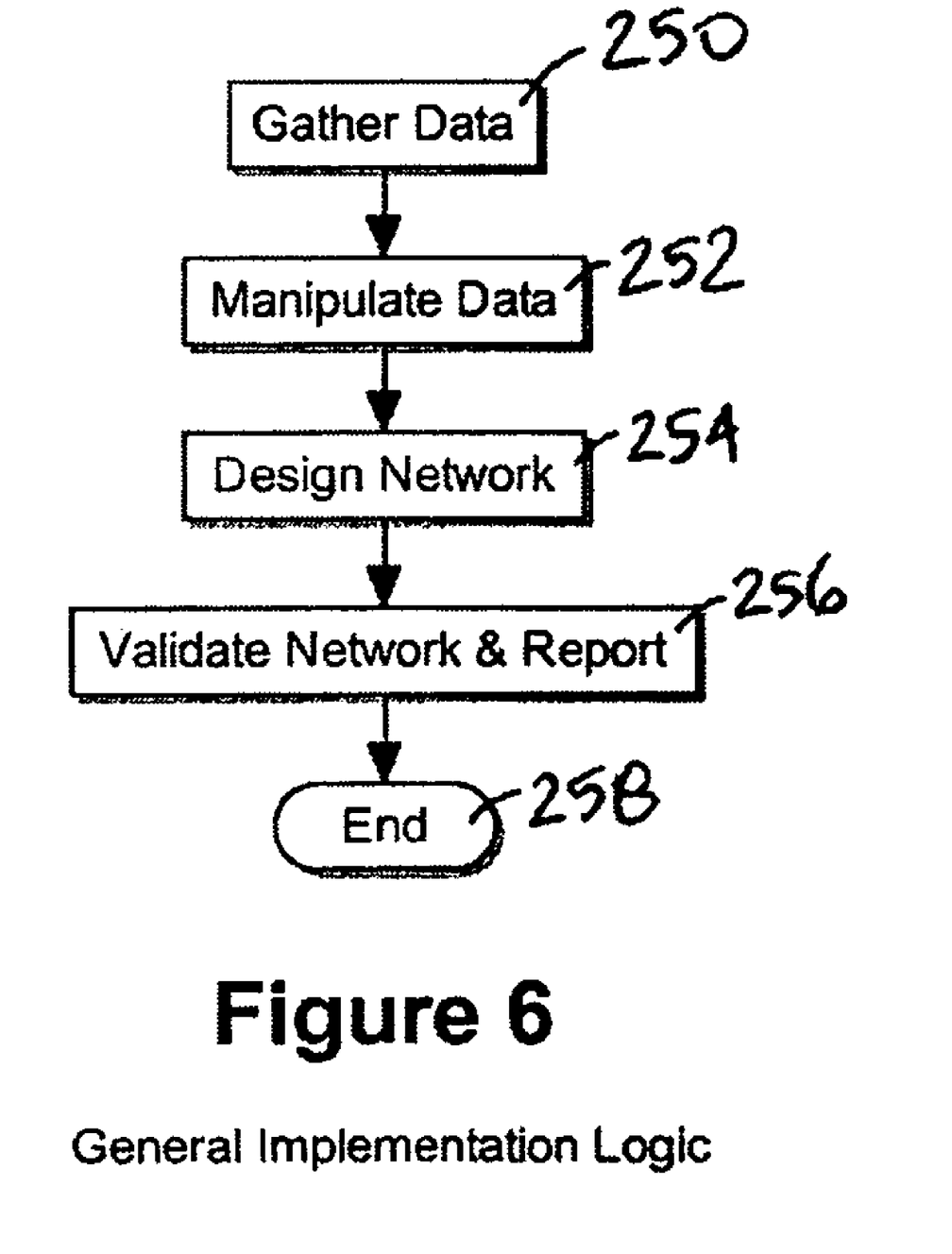
FIG. 6 is a flow chart to illustrate general implementation logic of an embodiment of network planning and optimization process (S-TOP)

FIG. 6 shows general implementation logic for the S-TOP method. Commencing at block 250, the relevant network data is gathered. It is to be understood that the network data includes network demand data and network architecture data, which is described in detail below in conjunction with FIG. 7. At block 252, the data is manipulated as described in detail below. Moving to block 254, a network is designed based in part on the data gathered. Finally, at block 256, the network is validated and reports for the network are generated. The logic ends at state 258.

Figure 7:
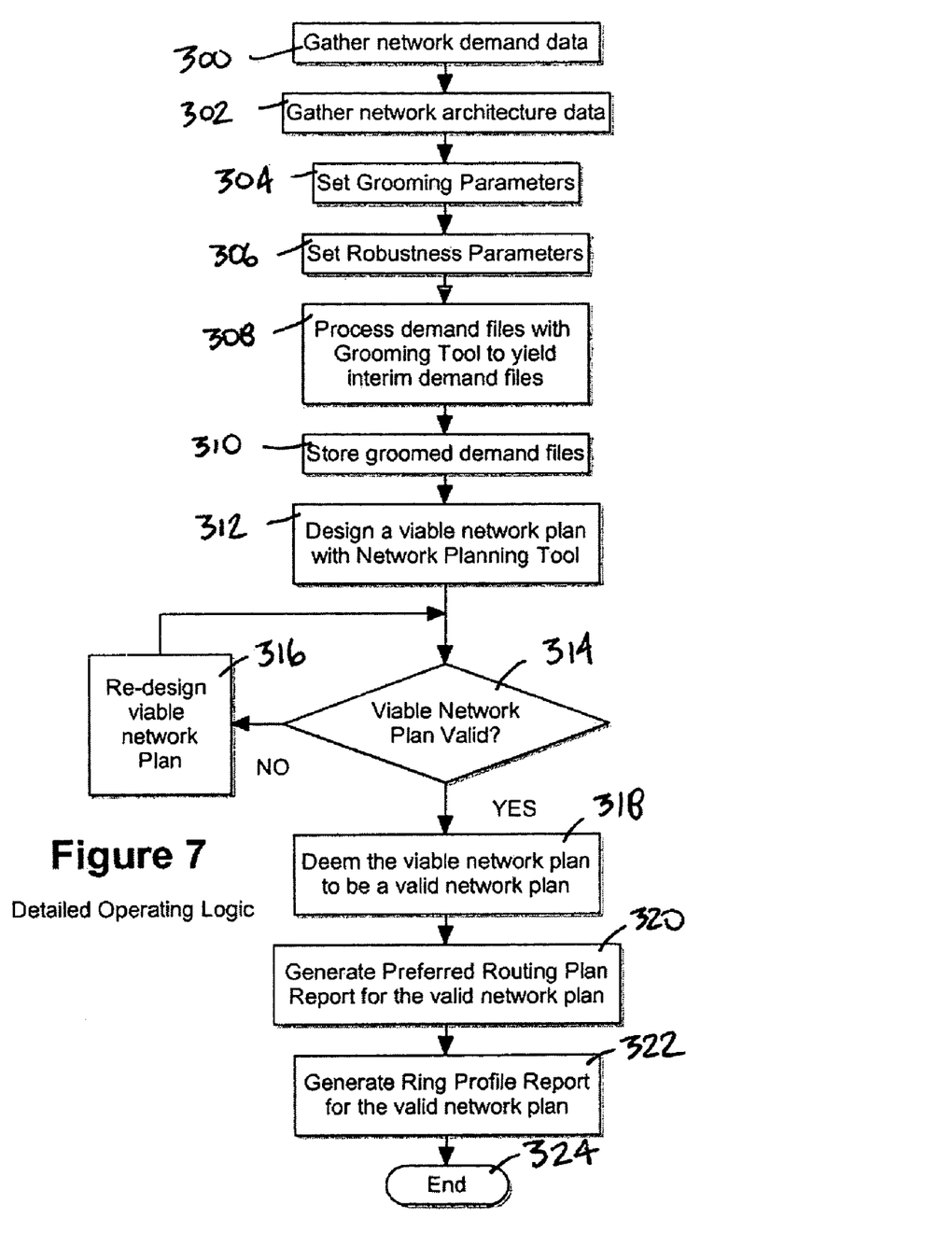
FIG. 7 is a flow chart to illustrate detailed operating logic of an embodiment of a network planning and optimization method (S-TOP)

FIG. 7 shows detailed operating logic for the S-TOP method. Commencing at block 300, network demand data is gathered. It is to be understood that the network demand data can include published network demand data and unpublished network demand data. The published demand data, for example, can include DS-1 end-to-end speculative forecast for non-switched services with 128, 256, 384, 1.5M, 1.5Z, T1, T1ZF, T1ZFN planning groups. Also, the published network demand data can include DS-3, OC-3, OC-12, and OC-48 high capacity end-to-end demand with 45M, EC1, SN32, SN33, STN, OC3, STS3, OC12, STS-12, OC-48, and OC-192 planning groups. Moreover, the published network demand data can include general trunk forecast (GTF) switch services forecasts including message trunk groups, competitive local exchange carrier (CLEC) and local number portability (LNP).

It can be appreciated that a user, e.g., a network planner, can add other required demands not included in the published forecasts, i.e., the unpublished network demand data. The unpublished network demand data can include end-to-end demands representing asynchronous transition plan by route, copper migration plan, dial-for-dial end-to-end demand, and long distance (LD) demand on interoffice (10F) transport rings. The unpublished network demand data can also include broadband demand, e.g., ATM, frame relay FR, Internet, video, etc. Additionally, the unpublished network demand data can include customer specific demands, e.g., inquiries on DS-1, DS-3, OC-3, etc.

Returning to the description of the logic, at block 302, network architecture data is gathered. The network architecture data can include lists of central offices with location information. Also, the network architecture data can include existing fiber network topology data, e.g., length, maximum capacity, spares, and loss per mile. Further, the network architecture data can include existing asynchronous systems topology data, e.g., maximum capacity and spares. Moreover, the network architecture data can include existing SONET systems data, e.g., type, speed, physical topologies, logical topologies, maximum span capacity, and available spares for each span. The network architecture data can also include fiber network expansion plan data, e.g., including new fiber and wavelength division multiplexing (WDM) line systems. Finally, the network architecture data can include common equipment cost information such as SONET ADM costs, regenerator costs, port (plug-in) costs, and loaded costs. It can be appreciated that for preprocessing of data for a given planning area, the existing network gateway and hubbing plans are also used.

Proceeding to block 304, grooming parameters are set, e.g., by a network designer. It is to be understood that the grooming parameters can include static or four directional (4D) hubbing plans, hubbing thresholds, and engineering STS-1 fill factors. Next, at block 306, robustness parameters are set. It is to be understood that the robustness parameters can include a loading factor and an A-Z shuffling factor.

Moving to block 308, the demand files gathered above are processed with a grooming tool in order to yield one or more interim demand files. In this embodiment, the grooming tool can be a web-based computer tool for automating gateway routing and hubbing of traffic. Also, the grooming tool can model the WDCS functionality by grooming circuits from DS1/VT1.5 to DS3/STS-1 with a relatively simple, easy-to-access user interface. The grooming tool logic is described in detail below in conjunction with FIG. 8.

Continuing to block 310, the interim demand files from the grooming tool are stored for later use in conjunction with network planning, and network robustness evaluation and testing. At block 312, a viable network plan can be designed using a network planning tool. In this embodiment, the network planning tool can be a windows-based software tool having a graphical user interface (GUI). The network planning tool can facilitate the development of a SONET ring topology by generating STS-1 routing plans, calculating design metrics in each step of the analysis and design, and creating summary and engineering reports. Network planning tool logic is described in detail below in conjunction with FIG. 9.

Moving to decision step 314, it is determined whether the viable network plan is a valid plan. In order to determine if the viable network plan is valid, the network planning tool validates the ring topology of each new SONET ring to be deployed. For example, spare system time-slots (TS) may be validated. Equipment availability and equipment location are also validated. Existing fiber capacity and equipment configuration for central office (CO) space availability is also validated. At decision step 314, if the viable network plan is not valid, the logic returns to block 316 and the viable network plan is re-designed with the network planning tool. The logic then returns to decision step 314 and continues as described above.

Conversely, if the viable network plan is valid, the logic moves to block 318 and the viable network plan is deemed to be a valid network plan. Thereafter, at block 320, a preferred routing plan report is generated for the valid network plan. Moving to block 322, a ring profile report is also generated for the valid network plan. The logic then ends at state 324.

Figure 8:
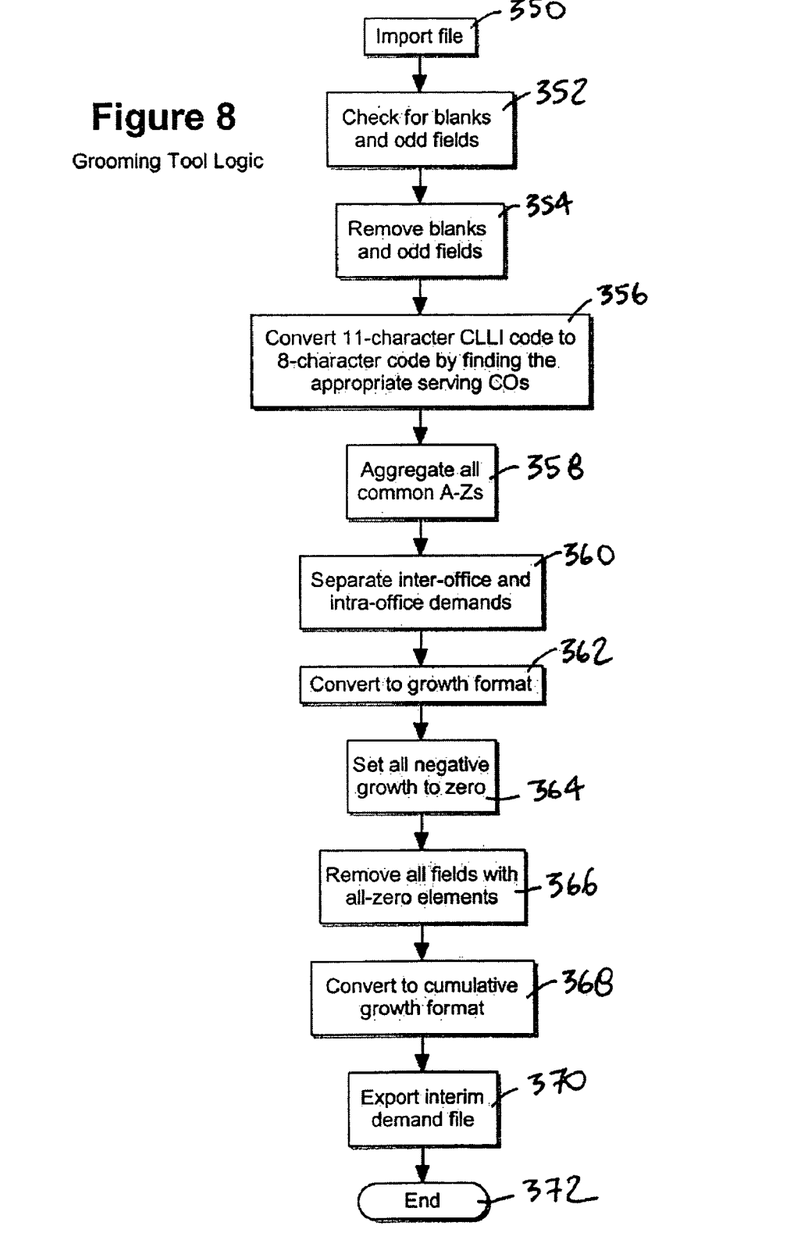
FIG. 8 is a flow chart to illustrate the logic of a network demand data pre-processing for the grooming tool.

Referring now to FIG. 8, the grooming tool logic is shown and commences at block 350 wherein a demand file is imported to the grooming tool. At block 352, the demand file is checked for blanks and odd fields. Moving to block 354, the blanks and odd fields are fixed or removed from the demand file. Proceeding to block 356, in a particular embodiment, an 11-character common language location identification (CLLI) codes of customer locations are converted to an 8-character code by finding the appropriate serving central offices (COs). At block 358, all common CO A-Zs are aggregated. Thereafter, at block 360, inter-office demands and intra-office demands are separated from each other.

Continuing to block 362, the demand file is converted to a growth format. Then, at block 364 all negative growth elements in the file are set to zero. At block 366, fields with all-zero elements are removed from the file. Proceeding to block 368, the file is converted to a cumulative growth format. Next, at block 370, an interim demand file is exported. It is to be understood that the interim demand file can be used by the network planning tool in the design of a viable network plan. The logic ends at 372.

Figure 9:
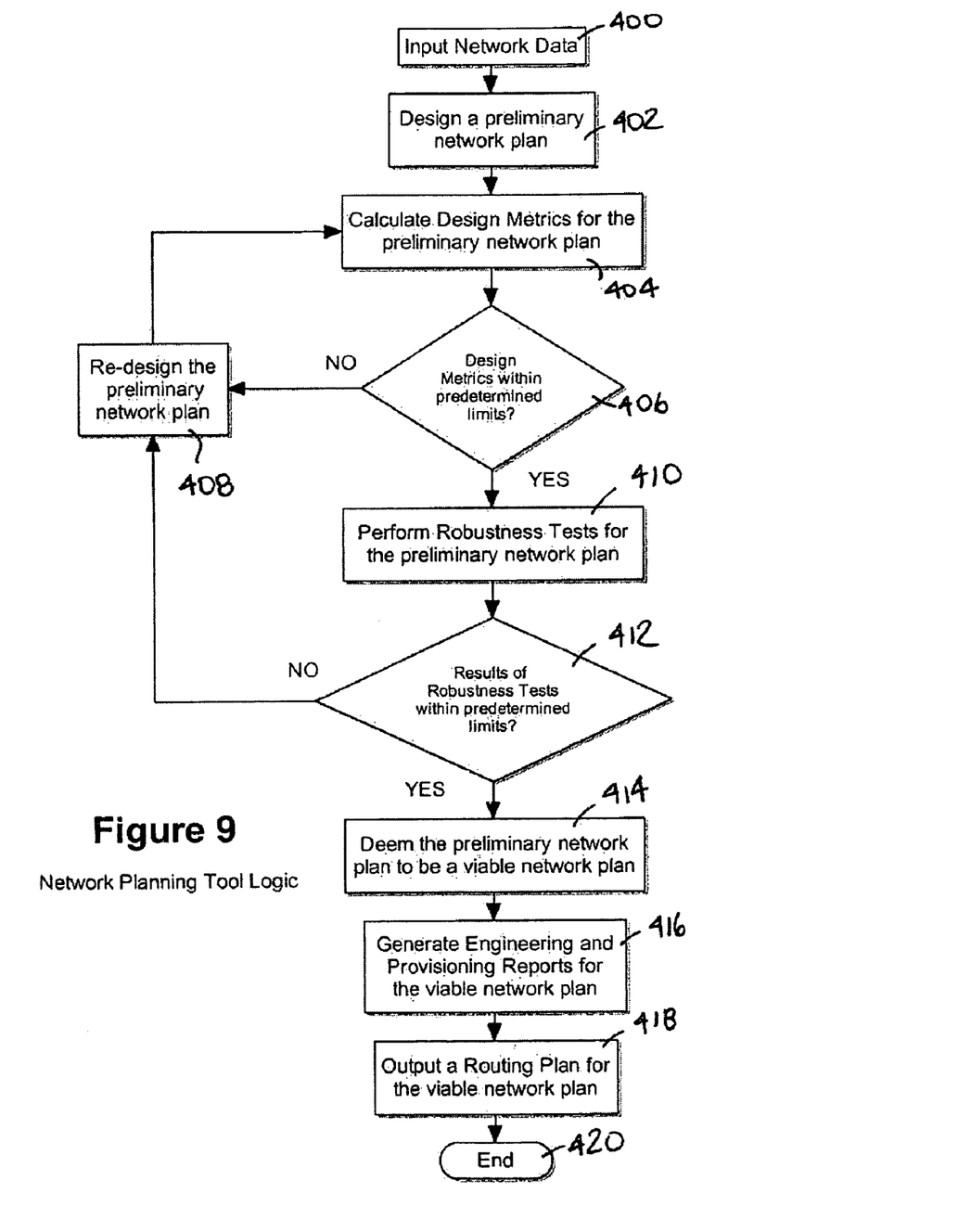
FIG. 9 is a flow chart to illustrate the logic of a network assessment and optimization process.

Referring now to FIG. 9, network planning tool logic is shown and commences at block 400 where network data is input to the network planning tool. The main inputs to the network planning tool can include existing network topology with spares, DS3/STS-1 preprocessed and aggregated end-to-end demands, STS-3 preprocessed and aggregated end-to-end demands, STS-12 preprocessed and aggregated end-to-end demands, and STS-48 preprocessed and aggregated end-to-end demands. It is to be understood that DS1/VT1.5 end-to-end demands can be input to the above-described grooming tool for grooming to DS3. These groomed demands can then be fed into the network planning tool in order to be combined with other DS3/STS-1 demands.

At block 402, a preliminary network plan is designed. The preliminary network plan can be developed based on the network data input to the network planning tool. The network demand data can be clustered by communities of interest. Moreover, it can be appreciated that the preliminary network plan design can include intra-cluster, adjacent-cluster, and express ring assignments. Proceeding to block 404, several design metrics for determining whether the preliminary network plan is feasible are calculated. The design metrics can include: ring achievable utilization, network survivability ratio, cost per routed unit demand, equipment cost, and overall network utilization.

It is to be understood that the ring achievable utilization, $U_r$, can be calculated using the following equation:

$$U_r = (1/\alpha)(N_{uts}/N_{tts})$$

where:
  $\alpha$ = demand hop factor on a bi-directional line switch ring (BLSR);
  $N_{uts}$ = number of used time slots on a ring; and
  $N_{tts}$ = total time slots on a ring.

The network survivability ratio, $S_r$, can be calculated using the following equation:

$$S_r = (D_{srv,r} + D_{srv,int})/D_{sv}$$

where:
  $D_{srv,r}$ = number of intra ring survivable end-to-end demands;
  $D_{srv,int}$ = number of inter-ring survivable end-to-end Demands (this value is set to "0" if unprotected ring interconnection is used); and
  $D_{sv}$ = number of served (routed) end-to-end demands.

Moreover, the cost per routed unit demand, $C_{DS3}$, can be calculated using the following equation:

$$C_{DS3} = (\Sigma C_e)/D_{sv}$$

where:
  $C_e$ = equipment cost; and
  $D_{sv}$ = number of served (routed) end-to-end demands.

The equipment cost, $C_e$, can be calculated using the following equation:

$$Ce = n_{adm}C_{adm} + n_{pl}C_{pl} + n_{sts}C_{sts} + n_r C_r + n_{dcs}C_{dcs}$$

where:
  $n_{adm}$ = number of ADMs used;
  $C_{adm}$ = installed cost of each ADM (terminal);
  $n_{pl}$ = number of DS-3 plugs used;
  $C_{pl}$ = cost of each DS-3 plug;
  $n_{sts}$ = number of STS-1 plugs used;
  $C_{sts}$ = cost of each STS-1 plug;
  $n_r$ = number of regenerators or repeaters used;
  $C_r$ = cost of each regenerator;
  $n_{dcs}$ = number of STS-1 plugs used on a DSX3 panel or broadband digital cross-connect system (BDCS); and
  $C_{dcs}$ = costs of each STS-1 plug on DSX3 panel or BDCS.

And, the overall network utilization, U, can be calculated using the following equation:

$$U = (1/N_L)\sum_i (N_{uc,i}/N_{tc,i})$$

where:

$N_L$=total number of links in the network;
$N_{uc,i}$=used capacity of link i; and
$N_{tc,i}$=total capacity of link i.

Continuing the description of the logic, at decision step 406 it is determined whether the design metrics are acceptable or within predetermined limits. If the design metrics are not within the predetermined limits, the logic moves to block 408 where the preliminary network plan is re-designed. The logic then returns to block 404 and proceeds as described above. At decision step 406, if the design metrics are acceptable or within the predetermined limits, the logic moves to block 410 and robustness tests are performed for the preliminary network plan to determine the robustness of the preliminary network plan, including determining the survivability of the preliminary network plan.

Moving to decision step 412, it is determined whether the results of the robustness tests are acceptable or within predetermined limits. If not, the logic proceeds to block 408 and the preliminary network plan is re-designed. The logic then continues as described above. If, on the other hand, the results of the robustness tests are acceptable or within predetermined limits, the logic proceeds to block 414. At block 414, the preliminary network plan is deemed viable. Continuing to block 416, engineering and provisioning reports are generated for the viable network plan. Then, at block 418, a routing plan for the viable network plan is output. The logic then ends at state 420.

It is to be understood that the S-TOP provides a holistic network analysis, design and planning process. The S-TOP is based on multi-period end-to-end service or circuit demands; existing fiber optic network topology and spares information; existing transmission facilities, including Async systems, SONET systems, and spares; and design objectives and assumptions. In addition, the process embodied by the network planning tool seeks to improve network costs, network survivability, and network utilization. Each ring's achievable utilization and network span utilization is increased by reducing cost per served demand (i.e., unit cost), fiber length and inter-ring traffic, where the drop-and-continue feature of SONET rings is not used.

Figure 10:
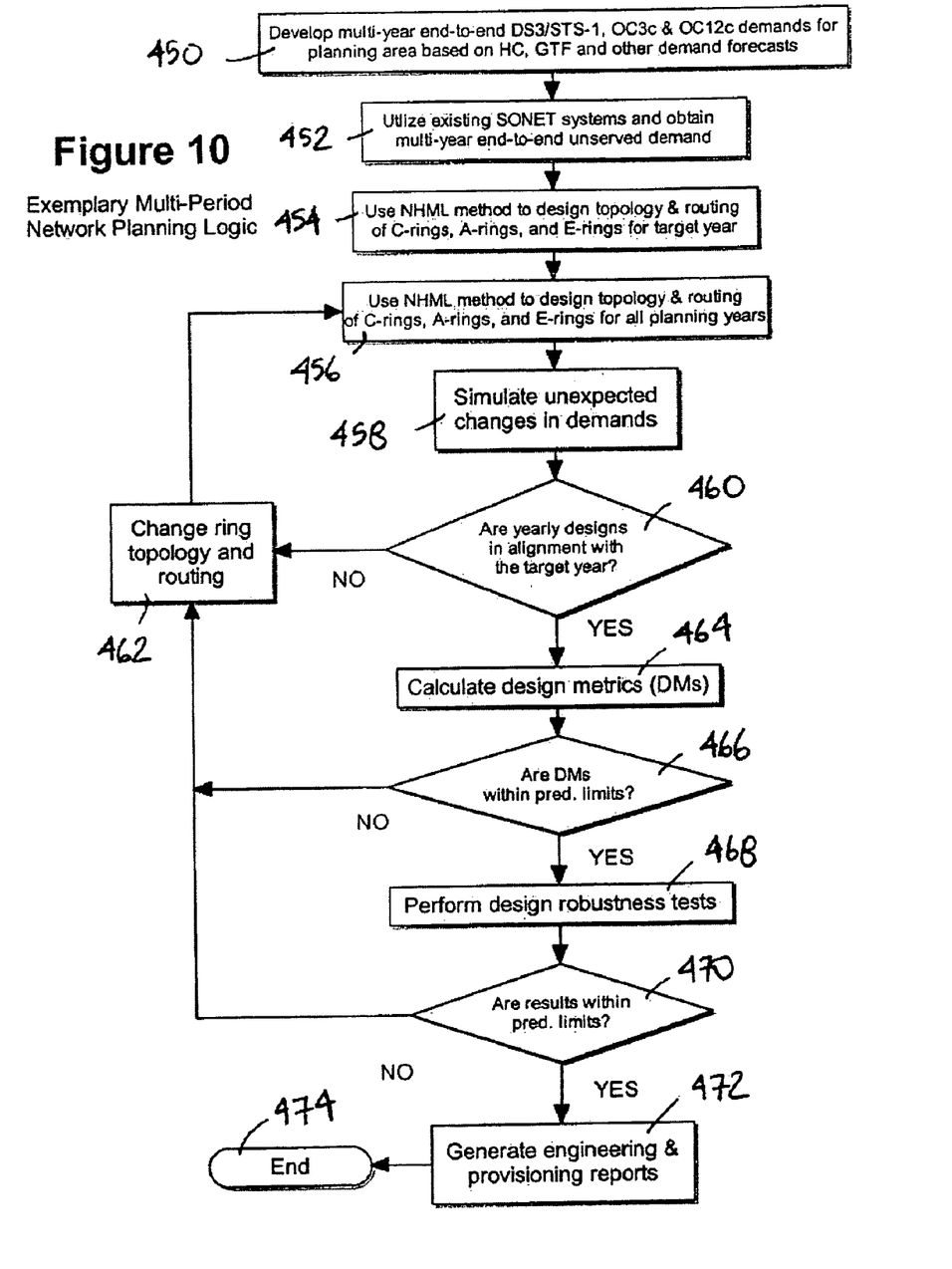
FIG. 10 is a flow chart to illustrate exemplary (S-TOP) multi-period network planning logic.

FIG. 10 shows exemplary S-TOP multi-year network planning logic based in part on the logic described in conjunction with FIG. 7, FIG. 8, and FIG. 9. Commencing at block 450, multi-year end-to-end DS3/STS-1, OC3, OC12, OC48 and OC192 demands for a planning area based on HC, GTF and other demand forecasts are developed. At block 452, existing SONET systems are utilized to obtain multi-year end-to-end unserved demand. Next, at block 454 the Non-Hierarchical Multi Level (NHML) ring design method is used to develop topology and routing of C-rings, A-rings, and E-rings for a target year. Moving to block 456, the NHML method is used to design topology and routing of C-rings, A-rings, and E-rings for all planning years.

Continuing to block 458, unexpected changes in demands are simulated. Thereafter, at decision step 460, it is determined whether yearly designs are in alignment with the target year. If not, the logic moves to block 462, where the ring topology and routing are changed. The logic then returns to block 456 and continues as described above. If the yearly designs are in alignment with the target year, the logic moves to block 464 and design metrics are calculated. Proceeding to decision step 466, it is determined if the design metrics are acceptable or within predetermined limits. If not, the logic moves to block 462 and continues as described above. However, if the design metrics are acceptable or within predetermined limits, the logic proceeds to block 468.

Proceeding to block 468, robustness tests are performed. Thereafter, at decision diamond 470, it is determined whether the results of the design robustness tests are acceptable or within predetermined limits. If not, the logic moves to block 462 and continues as described above. On the other hand, if the results of the design robustness tests are acceptable or within predetermined limits, the logic moves to block 472 and engineering and provisioning reports are generated for the network designed above. The logic then ends at state 474.

It is to be understood that the above-described logic can be used for numerous transport network analysis, design, and planning applications. In one exemplary application, the S-TOP method can be used to evaluate SONET technology, e.g., evaluating a unidirectional path switched (UPSR) ring versus a bi-directional line switched (BLSR) ring. The S-TOP method can also be used to evaluate the usage of a particular optical carrier level versus another optical carrier level (e.g., OC-48 versus OC-192). In another application, the S-TOP method can be used to evaluate network service protection, e.g., drop and continue on a working channel (DCW) versus drop and continue on a protection channel (DCP). Further, the S-TOP method can be used to evaluate fiber network evolution, i.e., new fiber spans, the use of 2 fiber (2F) ring, the use of 4 fiber (4F) rings, and the use of dense wavelength division multiplexing (DWDM) for fiber relief.

It is to be further understood that the S-TOP method can be used to evaluate intra-office node interconnection. The S-TOP method can also be used to evaluate network hubbing plans, e.g., a particular static plan versus a different static plan, or a particular static plan versus a four directional (4D) plan. Additionally, the S-TOP method provided by the present disclosure can be used to evaluate distributed grooming and network grooming threshold settings. Moreover, the S-TOP method can be used to provide a forecast of component changes and incorporate error sensitivity. The S-TOP method can be used to evaluate service demand changes, for example, based on market dynamics, volume, etc. Finally, in a non-limiting, exemplary embodiment, the S-TOP method can be used to evaluate service segregation and service integration (i.e., allocated rings versus shared rings.)

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    gathering, at a network planning computer system, network demand data that includes published network demand data and unpublished network demand data;
    gathering, at the network planning computer system, network architecture data;
    processing, at the network planning computer system, at least one demand file including the network demand data and the network architecture data with a grooming tool to generate at least one interim demand file at least partially based on the network demand data and the network architecture data;
    automatically generating, at the network planning computer system, a network plan based at least partially on the at least one interim demand file, wherein the network plan is automatically generated by a network planning tool; and storing the network plan at a memory of the network planning computer system.

2. The method of claim 1, further comprising setting a grooming parameter including at least one of a hubbing plan parameter, a hubbing threshold data parameter, and a network robustness parameter.

3. The method of claim 1, further comprising:
converting the at least one demand file into a cumulative growth format, wherein the conversion is performed by the grooming tool;
purging the at least one demand file, wherein the at least one demand file is purged by the grooming tool; and
inputting the at least one interim demand file into the network planning tool.

4. The method of claim 1, further comprising validating the network plan to produce a valid network plan.

5. The method of claim 4, further comprising generating a routing plan report associated with the valid network plan.

6. The method of claim 4, further comprising generating a ring profile report associated with the valid network plan.

7. The method of claim 1, wherein the unpublished network demand data comprises an end-to-end demand representing at least one of an asynchronous transition plan, a copper migration plan demand, a dial-for-dial end-to-end demand, a long distance demand on interoffice transport rings, a broadband demand, and a customer specific demand.

8. The method of claim 1, wherein the published demand data comprises an end-to-end speculative forecast associated with at least one of non-switched services, a high capacity end-to-end demand, and a general trunk forecast switch services forecast.

9. A computer system to design a communication network, the computer system comprising:
a processor, the processor to execute:
network demand evaluation logic to receive network demand data that includes published network demand data and unpublished network demand data;
network architecture evaluation logic to receive network architecture data; and
an automated network planning routine to respond to the network demand evaluation logic and the network architecture evaluation logic and to generate a network plan at least partially based on the network demand data and the network architecture data, wherein the automated network planning routine comprises logic to provide grooming parameters; and
a memory coupled to the processor, the memory to store the network plan.

10. The computer system of claim 9, wherein the grooming parameters include hubbing thresholds.

11. The computer system of claim 10, wherein the network planning routine further comprises logic to provide settable robustness parameters.

12. The computer system of claim 11, wherein the network demand evaluation logic further comprises logic to process at least one demand file to produce at least one interim demand file.

13. The computer system of claim 12, wherein the network planning routine further comprises logic to generate the network plan at least partially based on at least one of the interim demand file, the network demand data, and the network architecture data.

14. The computer system of claim 13, further comprising network validation logic responsive to the network planning logic, wherein the network validation logic is to determine when the network plan is valid.

15. The computer system of claim 14, further comprising a routing plan module including logic to generate a routing plan report when the network plan is valid.

16. The computer system of claim 15, further comprising logic to generate a ring profile report when the network plan is valid.

17. A method of designing a telecommunications network, the method comprising:
gathering, at a network planning computer system, network optical demand data;
gathering, at the network planning computer system, network optical architecture data;
automatically generating, at the network planning computer system, a preliminary network plan that is at least partially based on the network optical demand data and the network optical architecture data;
determining, at the network planning computer system, whether the preliminary network plan is a viable network plan; and
when the preliminary network plan is viable, storing the preliminary network plan at a memory of the network planning computer system.

18. The method of claim 17, further comprising calculating at least one design metric of the viable network plan, wherein the at least one design metric is at least partially based on the network optical demand data, the network optical architecture data, and the preliminary network plan.

19. The method of claim 18, further comprising determining whether the at least one design metric is within a corresponding predetermined design metric limit.

20. The method of claim 19, wherein the at least one design metric comprises one of a ring achievable utilization, a network survivability ratio, a cost per routed unit demand, an equipment cost, and an overall network utilization.

21. The method of claim 17, further comprising performing at least one robustness test on the preliminary network plan.

22. The method of claim 21, further comprising determining whether a result of the at least one robustness test is within a corresponding predetermined robustness limit.

23. The method of claim 22, further comprising determining whether the preliminary network plan is a viable network plan, wherein the determination is at least partially based on the at least one design metric and the result of the at least one robustness test.

24. The method of claim 23, further comprising determining whether the viable network plan is valid.

25. The method of claim 24, further comprising generating a routing plan report when the viable network plan is valid.

26. The method of claim 24, further comprising generating a ring profile report when the viable network plan is valid.

27. A computer system to design a communication network, the computer system comprising:
a processor; and
a memory coupled to the processor, wherein the memory stores:
a data gathering module that, when executed by the processor, causes the processor to receive demand data and network architecture data;
a data manipulation module including a grooming tool that, when executed by the processor, causes the processor to generate at least one interim demand file; and
a network design module responsive to the data manipulation module, the network design module including a network planning tool to generate a network plan;
wherein the network plan is stored at the memory.

28. The computer system of claim 27, wherein the grooming tool is to receive network demand data from the data gathering module.

29. The computer system of claim 28, wherein the grooming tool is to transform the network demand data into at least one interim demand file.

30. The computer system of claim 29, wherein the network planning tool is to receive the at least one interim demand file.

31. The computer system of claim 27, wherein the network planning tool is to receive network architecture data prior to generating the network plan.

32. The computer system of claim 31, wherein the network planning tool is to automatically generate the network plan at least partially based on the network architecture data.

33. The computer system of claim 27, wherein the network planning tool is to automatically generate the network plan at least partially based on the at least one interim demand file.

34. The computer system of claim 27, wherein the memory further includes a validation and reporting module to validate the network plan and to report a routing plan that is based at least in part on the network plan.

* * * * *